United States Patent
Cripe

(10) Patent No.: US 7,640,814 B2
(45) Date of Patent: *Jan. 5, 2010

(54) DEMAGNETIZATION-FIELD ENHANCING MAGNETOMETER

(75) Inventor: David W. Cripe, Chatham, IL (US)

(73) Assignee: Continental Automotive Systems US, Inc., Auburn Hills, MI (US)

(*) Notice: Subject to any disclaimer, the term of this patent is extended or adjusted under 35 U.S.C. 154(b) by 666 days.

This patent is subject to a terminal disclaimer.

(21) Appl. No.: 11/352,749

(22) Filed: Feb. 13, 2006

(65) Prior Publication Data

US 2007/0034021 A1    Feb. 15, 2007

Related U.S. Application Data

(60) Provisional application No. 60/707,927, filed on Aug. 12, 2005.

(51) Int. Cl.
*G01L 3/00*    (2006.01)

(52) U.S. Cl. ................................. 73/862.331

(58) Field of Classification Search ............................... 73/862.331–862.336
See application file for complete search history.

(56) References Cited

U.S. PATENT DOCUMENTS

| | | | |
|---|---|---|---|
| 5,351,555 A | 10/1994 | Garshelis | |
| 5,696,575 A | 12/1997 | Kohnen et al. | |
| 5,889,215 A | 3/1999 | Kilmartin et al. | |
| 5,939,881 A | 8/1999 | Slater et al. | |
| 6,145,387 A | 11/2000 | Garshelis | |
| 6,222,363 B1 | 4/2001 | Cripe | |
| 6,298,467 B1 | 10/2001 | Chuang et al. | |
| 6,300,855 B1 | 10/2001 | Clark et al. | |
| 6,346,812 B1 | 2/2002 | May et al. | |
| 6,516,508 B1 | 2/2003 | Gandarillas | |
| 6,553,847 B2 | 4/2003 | Garshelis | |
| 6,698,299 B2 | 3/2004 | Cripe | |
| 6,823,746 B2* | 11/2004 | Viola et al. | 73/862.335 |
| 2002/0162403 A1 | 11/2002 | Cripe | |
| 2004/0007083 A1* | 1/2004 | Viola et al. | 73/862.335 |
| 2007/0034004 A1* | 2/2007 | Cripe | 73/331 |
| 2007/0038401 A1* | 2/2007 | Cripe | 702/104 |
| 2007/0062312 A1* | 3/2007 | Cripe | 73/862.333 |
| 2007/0069723 A1* | 3/2007 | Cripe | 324/253 |

\* cited by examiner

*Primary Examiner*—Lisa M Caputo
*Assistant Examiner*—Freddie Kirkland, III

(57) ABSTRACT

A magnetometer for a force sensor assembly includes first inner and outer coils that are spaced axially apart from second inner and outer coils. Between the inner and outer coils is a plurality of magnetic strips. These magnetic strips are disposed at axially distinct portions within the inner and outer coils to detect magnetic field asymmetry. A drive circuit is connected to the inner coils and the outer coils generate an alternating magnetic field. The magnetometer of this invention creates an artificially enhanced demagnetization field reducing hysteresis within the sensor assembly.

18 Claims, 2 Drawing Sheets

DEMAGNETIZATION-FIELD ENHANCING MAGNETOMETER

CROSS REFERENCE TO RELATED APPLICATION

This application claims priority to U.S. Provisional application No. 60/707,927 filed on Aug. 12, 2005.

BACKGROUND OF THE INVENTION

This invention generally relates to a magnetometer for a torque sensor. More particularly, this invention relates to a magnetometer including several coils disposed relative to each for measuring torque related divergent magnetic fields.

A non-contact force sensor includes a force transducer element that responds to the application of force by generating a magnetic field. The generated magnetic field is then detected by a magnetometer. The force transducer element typically includes a magnetoelastic material that responds to the application of force by generating a magnetic field. The application of force to the magnetoelastic material creates shear stresses within the magnetized regions causing the direction of the magnet field generated by the force transducer element to shift from a substantially circumferential direction to a helical direction. The helical shifting of the magnetic field is detected as an axial component of the magnetic field. The axial component of the magnetic field is proportional to the applied force and provides an accurate and reliable indication of torque applied to a torque element.

Sensing of the magnetic field and specifically the axial components of the distortions in the magnetic field caused by force is accomplished through the use of a magnetometer or magnetic field sensor. A commonly used type of magnetic field sensor is a flux gate sensor, which is fabricated as a coil of magnet wire that generates a magnetic field to magnetically saturate a core of magnetically saturatable material. The coil is energized by an alternating current that provides periodic magnetic saturation of the core. The magnetic field produced by the force transducer is superimposed on the periodic magnetic field generated by the coils. The superimposing the magnetic field produced by the torque transducer shaft creates an asymmetry in the magnetic saturation of the coils. Changes in the inductance of the coils due to the magnetic saturation results in a voltage that is induced to the coils. It is this voltage that is measured to determine the amplitude and direction of force applied to the force transducer element.

It is commonly observed within magnetoelastic torque transducers a magnetic hysteretic effect wherein the zero-torque magnetic field emanating from the transducer does not return to zero amplitude following the application and removal of a stimulus torque. It is observed that the amplitude of the magnetic hysteresis resulting from the application of a force varies with the square of the magnetic flux passing within the transducer element, as a consequence of the magnetic field generated in the transducer from this force.

Consequently it is an object of the current invention to provide a means of attenuating the effects of magnetic hysteresis within the transducer through the operation of the magnetometer.

SUMMARY OF THE INVENTION

An example magnetometer according to this invention includes first inner and outer coils that are spaced axially apart from second inner and outer coils. Between the inner and outer coils is a plurality of magnetic strips. These magnetic strips are disposed at axially distinct portions within the inner and outer coils to detect magnetic field asymmetry.

The example magnetometer device according to this invention includes first and second inner coils disposed about a common axis and spaced axially apart. The first outer coil is disposed concentrically relative to the first inner coil and the second outer coil is also disposed concentrically about the second inner coil. Between the first inner coil and the first outer coil is a first plurality of magnetically saturatable elements. These magnetically saturatable elements are disposed in a parallel manner with respect to the axis. Between the second inner coil and the second outer coil is a second plurality of magnetically saturatable elements. These elements become saturated in the presence of a magnetic field.

A drive circuit is connected to the inner coils and the outer coils to generate an alternating magnetic field. This alternating magnetic field selectively and alternatively magnetically saturates each of the first and second plurality of magnetic saturatable elements. The inner coils generate a magnetic field in a first direction and the outer coils generate a magnetic field in a second direction that is opposite the first direction. The opposing magnetic fields created by the inner and outer coils concentrate the emitted field into the magnetically saturable elements, and largely cancel any externally magnetic field.

The magnetometer is disposed about a force-receiving element that includes a magnetoelastic material. The magnetoelastic material generates a magnetic field responsive to application of a force. This magnetic field is super-imposed on the magnetically saturatable elements and creates an imbalance in a voltage that is measured at an inner node and an outer node. The generation of a magnetic field by the magnetoelastic material causes an asymmetric magnetic field that in turn creates the voltage signal indicative of the applied force.

Magnetometer accuracy is affected by magnetic hysteresis that can result in an undesirable amount of inaccuracy within the sensor assembly. Further, the magnetometer of this invention creates an artificially enhanced demagnetization field that results in a reduction of hysteresis within the torque transducer. It does this by generating a counter-magnetic field opposing that generated by the transducer so that the net magnetic field within both the magnetically saturable elements and the magnetoelastic transducer so that the magnetic flux within the transducer is kept to a minimum of amplitude.

Accordingly, the magnetometer device according to this invention reduces the effects of hysteresis to provide an overall improvement and accuracy to the measurements obtained by a torque sensor assembly.

These and other features of the present invention can be best understood from the following specification and drawings, the following of which is a brief description.

DETAILED DESCRIPTION OF THE PREFERRED EMBODIMENT

Figure 1:
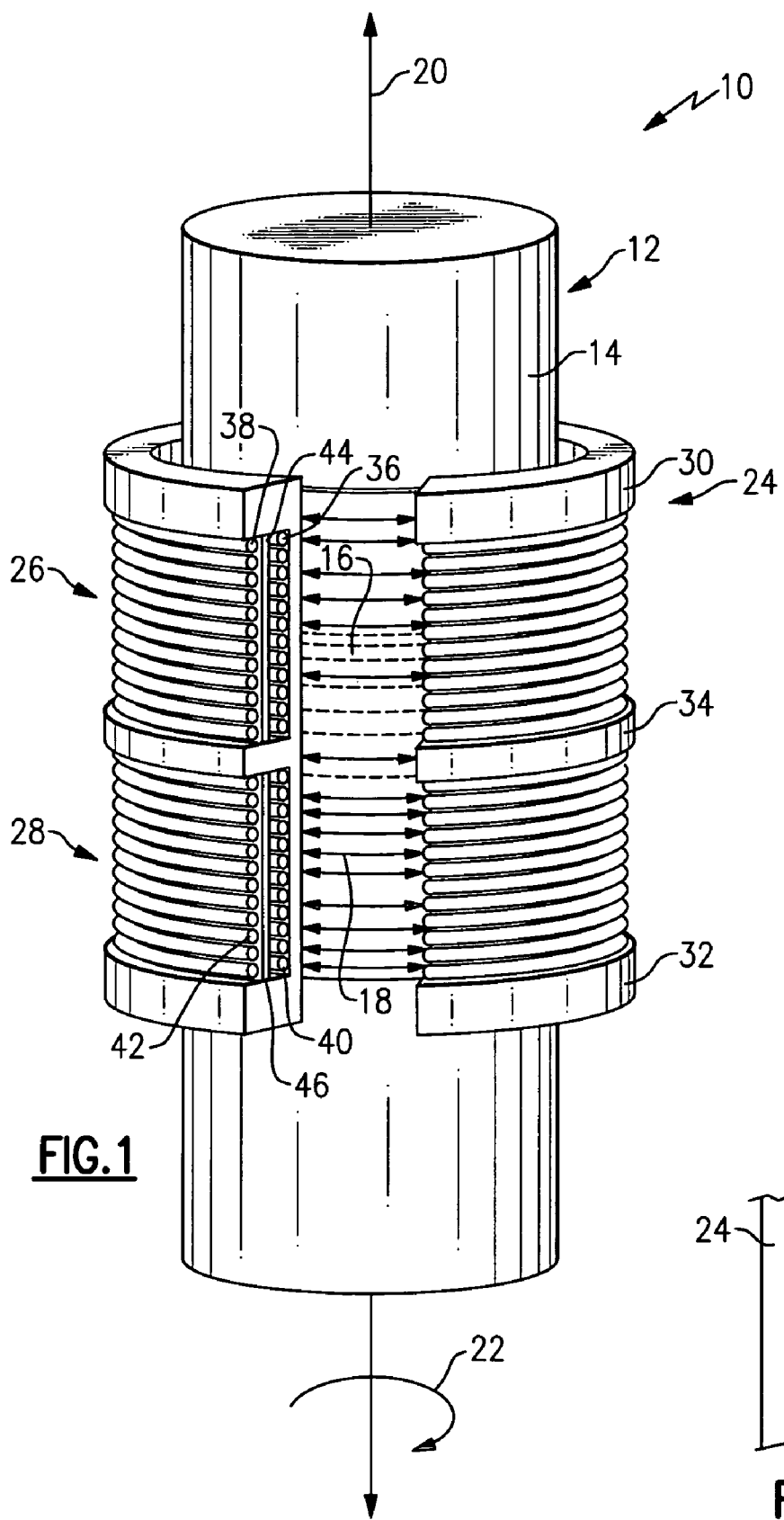
FIG. 1 is a schematic illustration of a portion of a magnetometer device according to this invention.
Figure 2:
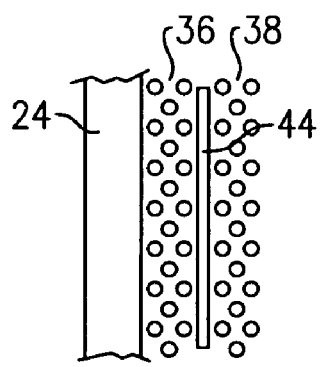
FIG. 2 is an enlarged cross-sectional view of a portion of a magnetometer device according to this invention.

Referring to FIGS. 1 and 2, a torque sensor assembly 10 includes a torque transducer 12. The torque transducer 12 includes a shaft 14 disposed about an axis 20. The shaft 14 supports a ring of magnetoelastic material 16. The ring of magnetoelastic material 16 generates a magnetic field 18 responsive to the application of force as is indicated at 22. A bobbin 24 is disposed concentrically about the axis 20 and also the torque transducer 12.

The bobbin 24 supports a first inner coil 36, a first outer coil 38 and a second inner coil 40 and a second outer coil 42. The first inner coil 36 and the first outer coil 38 are disposed within a first axial region 26. The second inner coil 40 and the second outer coil 42 are disposed in a second axial region 28. The first and second axial regions 26, 28 are separated an axial distance apart.

Disposed between the first inner coil 36 and the first outer coil 38 is a first plurality of magnetically saturatable elements 44. The magnetically saturatable elements 44 comprise a wire that includes a very high length to diameter ratio. The first plurality of magnetically saturatable elements 44 are dispersed in equal angular segments about the bobbin 24 and concentrically with the axis 20. A second plurality of magnetically saturatable elements 46 is disposed between the second inner coil and the second outer coil 42.

The second plurality of magnetically saturatable elements 46 is also comprised of a plurality of wires that is disposed equal angularly about the bobbin 24. The bobbin 24 itself includes a first flange 30, a second flange 32 and middle flange 34. The middle flange 34 provides for the separation of the first inner and outer coils 36, 38 from the second inner and outer coils 40, 42.

Figure 3:
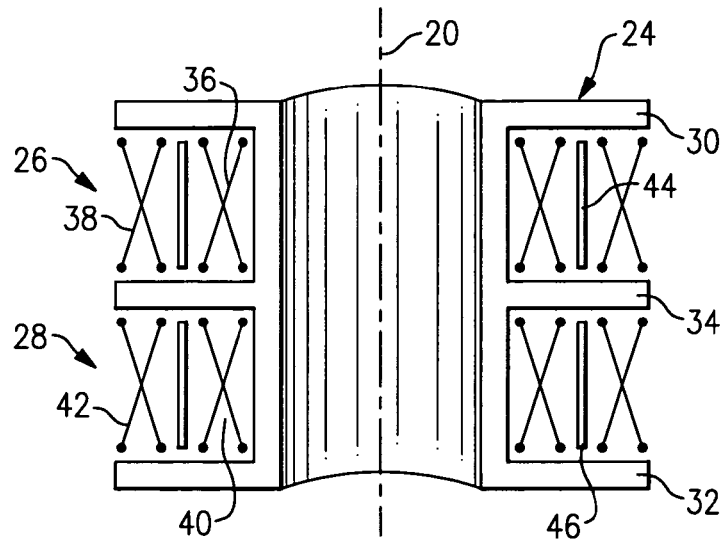
FIG. 3 is a cross-section of an example coil assembly according to this invention.

Referring to FIG. 3, a schematic representation of the example bobbin 24 illustrates the relative position of the first inner and outer coil assemblies 36, 38 relative to the second inner and outer coil assemblies 40, 42. Note that the first inner and outer coil assemblies 36, 38 are disposed such that the first plurality of magnetically saturatable elements 44 are disposed there between. The second plurality of magnetically saturatable elements 46 are disposed between the second inner and outer coils 40, 42. The first inner coil 36 is coupled electrically to the second inner coil 40 and generates a magnetic field orientated in a first direction. The second outer coil 42 is coupled to the first outer coil 38 and generates a second magnetic field orientated in a second direction that is opposite the first direction. The opposing magnetic field generates a much lower inductance as compared to coils that are mounted within the bobbin 24 individually.

Figure 4:
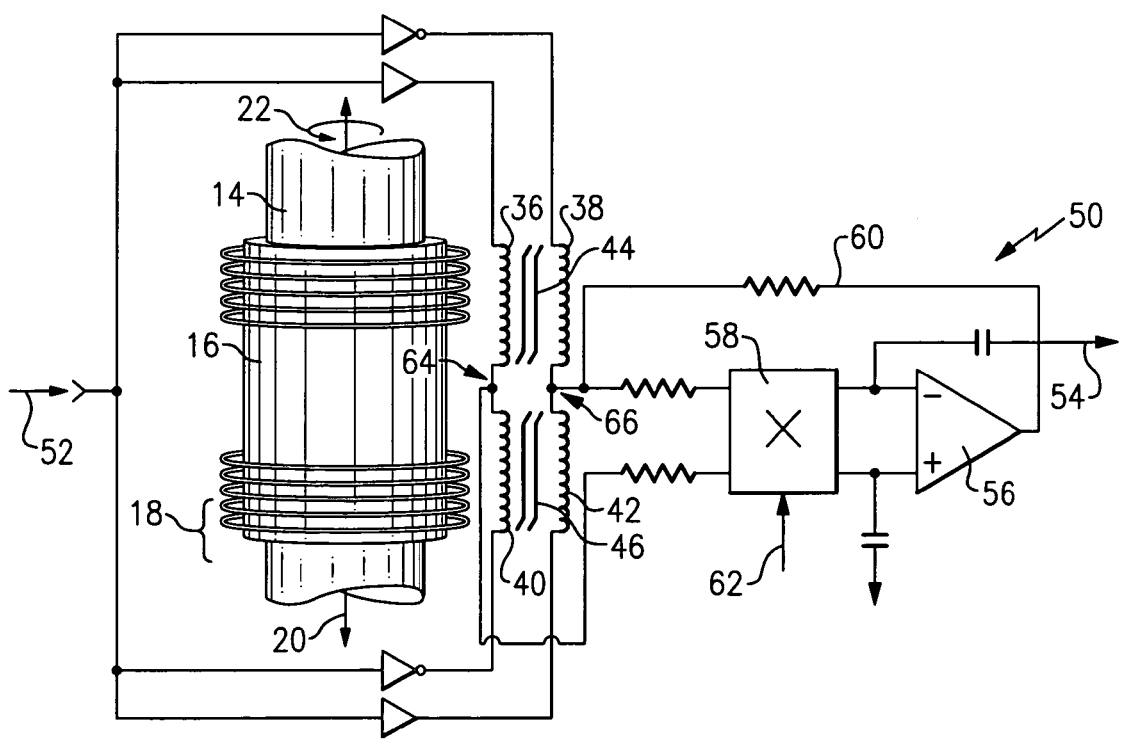
FIG. 4 is a schematic representation of a torque sensor assembly including an example drive circuit according to this invention.

Referring to FIG. 4, a schematic representation of the example sensor assembly 10 according to this invention includes a drive circuit 50. The drive circuit 50 provides the current input that excites the inner coil assemblies 36, 40 and outer coil assemblies 38, 42. The drive circuit 50 provides an alternating current through each of the coil assemblies 36, 38, 40 and 42 to generate the desired opposing magnetic fields. As the drive alternating current alternates between peaks and valleys, so does the generated alternating magnetic field. The alternating magnetic field results in magnetic saturation of each of the pluralities of inductors 44, 46. The magnetic saturation of the inductors 44, 46 are evenly distributed due to the orientation and magnetic fields generated by the identically configured inner coils 36, 40 and outer coils 38, 40. This provides for the magnetic saturation of the magnetically saturatable elements in an even symmetrical manner.

Upon the application of a torque 22 to the torque transducer 12, the magnetoelastic material 16 generates a magnetic field 18. This magnetic field 18 is in direct proportion to the application of force 22. The magnetic field 18 generated by the magnetoelastic material 16 superimposes itself on the magnetically saturatable elements 44, 46. This imposition of the generated magnetic field 18 on the magnetically saturatable elements 44, 46 produce asymmetric magnetic field saturation. This asymmetric magnetic field saturation is detected through the measurement of voltage as an inner node 64 and an outer node 66.

The asymmetry in the magnetic field within the saturatable magnetic elements relative to the top and bottom axial regions 26, 28 of the magnetometer result in a voltage output at the node 64, 66. This voltage output is measured by the drive circuit 50.

Observing the voltage at the common nodes 64, 66 between the top and bottom axial regions 26, 28 generate an observed voltage waveform possessing an even order harmonics of the excitation current. The observed voltage waveform possesses phase and amplitude characteristics indicative of the amplitude of the magnetic field 18 and thus the torque applied to the shaft.

A signal related to the amplitude phase of the second harmonic content of this waveform is used as an input to a feedback loop 60. The feedback loop 60 feeds a current output to an inner amplifier and is delivered to the outer coil windings 38, 42. This generates an additional magnetic field that is equal and opposite of the magnetic field 18. This equal and opposite magnetic fields generated by the outer coils 38, 42 causes the magnetically saturatable elements 44, 46 to operate at a zero state of net flux and provides a demagnetization field that reduces the magnetic flux within the transducer element 12 such that little residual magnetism remains.

The drive circuit receives a drive clock input signal at 52 that aids in driving the inner and outer coils 36, 38, 40, 42. A signal 62 is input into a demodulator 58 that is in receipt of the voltage signal measured at the inner node 64 and the outer node 66. This signal is then input into an error integrator 56 to produce the output or feedback signal that is fed back to the first and second outer coils 38, 42 through the feedback circuit 60. Another output from the demodulator 58 results in an output 54 that utilizes an indication of applied force to the torque transducer 12.

Accordingly, the flux gate magnetometer of this invention includes magnetically saturatable elements 44, 46 driven by current from a feedback loop that generates a magnetic field in opposition to that generated by the torque transducer. This causes the saturatable elements to operate at zero net flux. This zero net flux provided by the magnetic field enhances the demagnetization of the torque transducer and specifically of the magnetoelastic material to minimize residual magnetic flux and improve and reduce magnetic hysteresis improving the accuracy of the torque transducer.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A magnetometer assembly comprising:
   a first inner coil and a second inner coil disposed about a common axis and separated axially;

a first outer coil disposed concentrically about the first inner coil and a second outer coil disposed concentrically about the second inner coil;

a first plurality of magnetically saturable wires disposed parallel to the common axis between the first inner coil and the first outer coil; and a second plurality of magnetically saturable wires disposed parallel to the common axis between the second inner coil and the second outer coil.

2. The assembly as recited in claim 1, wherein the first inner coil is electrically connected to the second inner coil and the first outer coil is electrically connected to the second outer coil.

3. The assembly as recited in claim 2, wherein the first inner coil and the second inner coil generate a magnetic field disposed in a first direction and the first outer coil and the second outer coil generate a magnetic field disposed in a second direction opposite to the first direction.

4. The assembly as recited in claim 2, including a bobbin onto which the first inner coil, the first outer coil, the second inner coil and the second outer coil are wound.

5. The assembly as recited in claim 4, including a distinct axial subdivision separating the first inner and outer coils from the second inner and outer coils.

6. The assembly as recited in claim 1, wherein the first and second pluralities of magnetically saturable wires comprise a length much greater than a cross-sectional area.

7. The assembly as recited in claim 1, wherein the first and second inner coils and the first and second outer coils are adapted to coaxially encircle a magnetic region of a magnetoelastic device.

8. The assembly as recited in claim 1, including a drive circuit to excite the first and second inner coils and the first and second outer coils and generate a magnetic field to magnetically saturate the first and second pluralities of magnetically saturable elements.

9. The assembly as recited in claim 8, including an inner node disposed electrically between the first inner coil and the second inner coil and an outer node disposed between the first outer coil and the second outer coil.

10. The assembly as recited in claim 8, wherein the drive circuit includes a means of observing a voltage at each of the inner and outer nodes.

11. The magnetometer assembly as recited in claim 1, wherein the first plurality of magnetically saturable wires are spaced circumferentially apart between the first outer coil and the first inner coil and the second plurality of magnetically saturable wires are spaced circumferentially apart between the second outer coil and the second inner coil.

12. A torque sensor assembly comprising:

a force bearing element including a magnetoelastic material disposed about a common axis; and a magnetometer including a first inner coil and a second inner coil disposed about the common axis and separated axially, a first outer coil disposed concentrically about the first inner coil and a second outer coil disposed concentrically about the second inner coil, a first plurality of magnetically saturable wires disposed parallel to the common axis between the first inner coil and the first outer coil, and a second plurality of magnetically saturable wires disposed parallel to the common axis between the second inner coil and the second outer coil.

13. The assembly as recited in claim 12, including an inner node disposed electrically between the first inner coil and the second inner coil and an outer node disposed electrically between the first outer coil and the second outer coil.

14. The assembly as recited in claim 13, including a drive circuit to excite the first and second inner coils and the first and second outer coils and generate a magnetic field to magnetically saturate the first and second pluralities of magnetically saturable elements.

15. The assembly as recited in claim 14, wherein the drive circuit includes a means of detecting a voltage at each of the inner node and the outer node.

16. A method of sensing torque with a torque sensor comprising the steps of:

a) generating a first magnetic field with a magnetoelastic material responsive to an application of force;

b) applying alternating current to a first inner coil and a second inner coil to generate a magnetic field in a first direction and to a first outer coil and a second outer coil in a second direction opposite the first direction at a level determined to magnetically saturated a first and second plurality of magnetically saturable wires disposed between the first and second inner and first and second outer coils; and c) detecting a distortion of the generated magnetic field caused by the first magnetic field indicative of a magnitude and direction of the applied force.

17. The method as recited in claim 16, including the step of detecting a voltage at an inner node electrically coupled to the first and second inner coils and at an outer node electrically coupled at the first and second outer coils, and determining a magnitude and direction based on the detected voltage.

18. The method as recited in claim 17, including the step of feeding a signal indicative of the amplitude and direction of a waveform detected at each of the inner and outer nodes back to the first and second outer coil windings to create a magnetic field with the first and second outer coils opposing the first magnetic field generated by the magnetoelastic material.

* * * * *